United States Patent
Wedig et al.

(10) Patent No.: US 9,923,588 B2
(45) Date of Patent: Mar. 20, 2018

(54) WIRELESS PIEZOELECTRIC INDICATOR

(71) Applicant: OneEvent Technologies, Inc., Mount Horeb, WI (US)

(72) Inventors: Kurt Joseph Wedig, Mount Horeb, WI (US); Daniel Ralph Parent, Mount Horeb, WI (US); Chris Snyder, Blanchardville, WI (US)

(73) Assignee: ONEEVENT TECHNOLOGIES, INC., Mount Horeb, WI (US)

( * ) Notice: Subject to any disclaimer, the term of this patent is extended or adjusted under 35 U.S.C. 154(b) by 0 days.

(21) Appl. No.: 15/152,132

(22) Filed: May 11, 2016

(65) Prior Publication Data

US 2016/0335857 A1    Nov. 17, 2016

Related U.S. Application Data

(60) Provisional application No. 62/160,157, filed on May 12, 2015.

(51) Int. Cl.
| | |
|---|---|
| G08B 25/08 | (2006.01) |
| H04B 1/38 | (2015.01) |
| G08B 1/08 | (2006.01) |
| G08B 25/00 | (2006.01) |

(52) U.S. Cl.
CPC ............... H04B 1/38 (2013.01); G08B 1/08 (2013.01); G08B 25/003 (2013.01)

(58) Field of Classification Search
CPC ........ G08B 17/10; G08B 17/113; G08B 1/08; G08B 25/10; G08B 29/181; G08B 25/003; H04B 1/38; G08C 17/02; G01M 13/045

USPC ............ 340/692, 506, 539.1, 628, 632, 531
See application file for complete search history.

(56) References Cited

U.S. PATENT DOCUMENTS

| | | | | |
|---|---|---|---|---|
| 6,259,372 | B1 * | 7/2001 | Taranowski | G08C 17/02 |
| | | | | 340/539.1 |
| 7,113,091 | B2 * | 9/2006 | Script | G08B 13/08 |
| | | | | 310/311 |
| 9,070,263 | B1 * | 6/2015 | Peeters | G08B 1/08 |
| 2004/0145465 | A1 * | 7/2004 | Stults | G08B 1/08 |
| | | | | 340/521 |
| 2011/0193714 | A1 * | 8/2011 | Albert | G08B 1/08 |
| | | | | 340/635 |
| 2015/0170503 | A1 | 6/2015 | Wedig et al. | |
| 2015/0294545 | A1 * | 10/2015 | Odette | G08B 1/08 |
| | | | | 340/628 |

* cited by examiner

*Primary Examiner* — Anh V La
(74) *Attorney, Agent, or Firm* — Foley & Lardner LLP

(57) ABSTRACT

An apparatus includes a piezoelectric sensor, a charge manager, a processor, and a transceiver. The piezoelectric sensor is configured to generate a first electrical signal upon detection of a vibration from a detector. The charge manager is configured to receive the first electrical signal and to generate a second electrical signal if it is determined that the first electrical signal is above a threshold. The processor is configured to receive the second electrical signal and to provide an instruction to transmit an alarm signal based at least in part on receipt of the second electrical signal. The transceiver is configured to receive the instruction and to transmit the alarm signal.

20 Claims, 5 Drawing Sheets

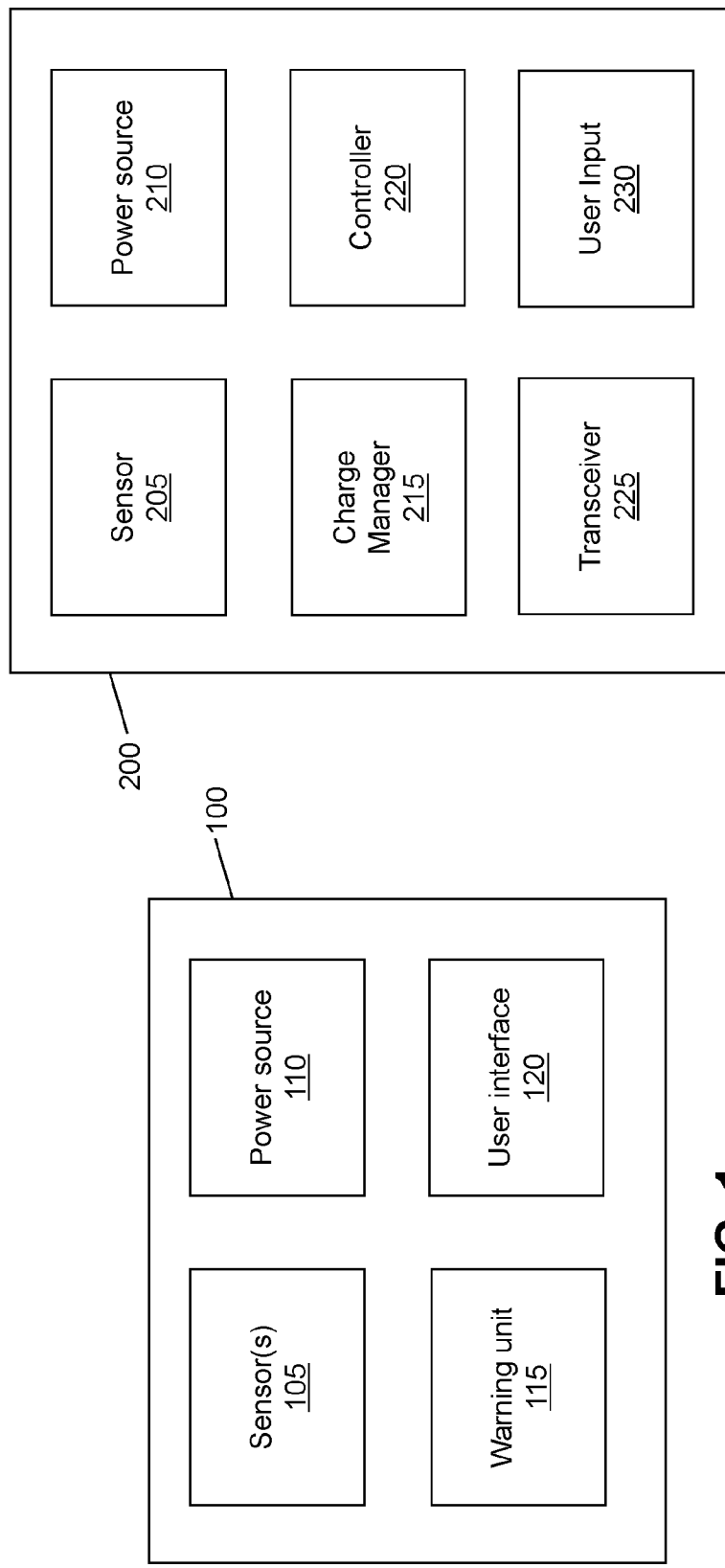

WIRELESS PIEZOELECTRIC INDICATOR

CROSS-REFERENCE TO RELATED APPLICATIONS

The present application claims the priority benefit of U.S. Provisional Application No. 62/160,157 filed on May 12, 2015, the entire disclosure of which is hereby incorporated by reference herein.

BACKGROUND

The following description is provided to assist the understanding of the reader. None of the information provided or references cited is admitted to be prior art. Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions.

SUMMARY

An illustrative apparatus includes a piezoelectric sensor, a charge manager, a processor, and a transceiver. The piezoelectric sensor is configured to generate a first electrical signal upon detection of a vibration from a detector. The charge manager is configured to receive the first electrical signal and to generate a second electrical signal if it is determined that the first electrical signal is above a threshold. The processor is configured to receive the second electrical signal and to provide an instruction to transmit an alarm signal based at least in part on receipt of the second electrical signal. The transceiver is configured to receive the instruction and to transmit the alarm signal.

An illustrative method includes detecting, by a piezoelectric sensor, a vibration from a detector to which the piezoelectric sensor is mounted. The method also includes generating, by the piezoelectric sensor, a first electrical signal in response to said detecting. The method also includes receiving, by a charge manager in communication with the piezoelectric sensor, the first electrical signal and generating a second electrical signal if it is determined that the first electrical signal is above a threshold. The method also includes providing, by a processor in communication with the charge manager, an instruction to transmit an alarm signal based at least in part on the second electrical signal. The method further includes transmitting, by a transceiver in communication with the processor, the alarm signal.

An illustrative non-transitory computer-readable medium has computer-readable instructions stored thereon that, upon execution by a processor, cause a device to perform operations. The instructions include instructions to cause a piezoelectric sensor to detect a vibration from a detector to which the piezoelectric sensor is mounted. The instructions also include instructions to generate a first electrical signal in response to detection of the vibration. The instructions also include instructions to cause a charge manager to generate a second electrical signal if it is determined that the first electrical signal is above a threshold. The instructions also include instructions to cause a processor in communication with the charge manager to generate an instruction to transmit an alarm signal based at least in part on the second electrical signal. The instructions further include instructions to cause a transceiver to transmit the alarm signal.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

Illustrative embodiments will hereafter be described with reference to the accompanying drawings.

FIG. 1 is a block diagram illustrating a detector in accordance with an illustrative embodiment.

FIG. 2 is a block diagram of a wireless indicator device that can be added to a sensory node to add communication capability, in accordance with an illustrative embodiment.

DETAILED DESCRIPTION

Figure 3:
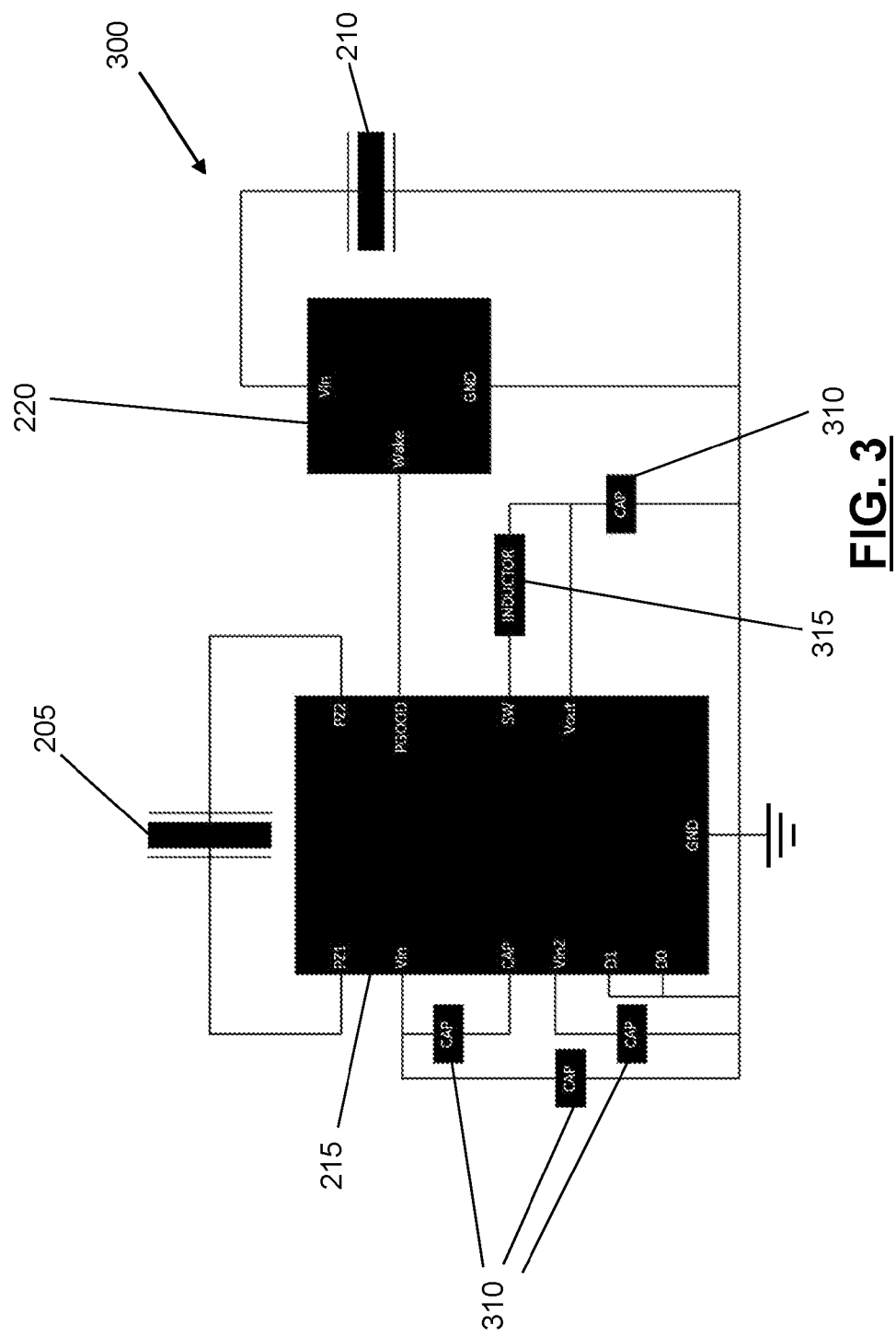
FIG. 3 is a circuit schematic illustrating a configuration of components of wireless indicator device, in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a block diagram illustrating a detector 100 in accordance with an illustrative embodiment. In alternative embodiments, detector 100 may include additional, fewer, and/or different components. Detector 100 includes sensor (s) 105, a power source 110, a user interface 120, and a warning unit 115. Sensor(s) 105 can be configured to sense environmental conditions. Examples of sensor(s) 105 include a smoke detector, a heat sensor, a carbon monoxide sensor, a nitrogen dioxide sensor, and/or any other type of hazardous condition sensor known to those of skill in the art. In an illustrative embodiment, power source 110 can be a battery. Detector 100 can also be hard-wired to the structure such that power is received from the power supply of the structure (i.e., utility grid, generator, solar cell, fuel cell, etc.). In such an embodiment, power source 110 can also include a battery for backup during power outages.

User interface 120 can be used by a system administrator or other user to program and/or test detector 100. User interface 120 can include one or more controls, a liquid crystal display (LCD) or other display for conveying information, one or more speakers for conveying information, etc. User interface 120 can also be used to test detector 100 to ensure that detector 100 is functional, to adjust a volume level of detector 100, to silence detector 100, etc. User interface 120 can also be used to alert a user of a problem with detector 100 such as low battery power or a malfunction.

Warning unit 115 can include a speaker and/or a display. The speaker can be used to play a beep, buzz, siren, etc. The sound can be used, for example, to indicate that a condition has been detected (e.g., excessive smoke, heat, carbon monoxide, etc.), to simulate an indication that the condition has been detected (e.g., during a test of the detector 100), or to indicate a status (e.g., low battery power or malfunction). The display can be include, for example, a light such as a light emitting diode or a strobe that can be used to visually alert occupants of a condition.

In some embodiments, detector 100 does not have the capability to communicate to a management system that an alarm condition has occurred. For example, many existing homes have smoke detectors that are capable of producing an audible indicator that the smoke detector has detected a high level of smoke. However, such smoke detectors do not typically have the capability to send an electromagnetic signal (e.g., a wireless signal) to a management system that indicates that the detector has sensed an abnormal condition.

FIG. 2 is a block diagram of a wireless indicator device 200 that can be added to a detector 100 to add wireless communication capability, in accordance with an illustrative embodiment. The wireless indicator device 200 can include a sensor 205, a power source 210, a charge manager 215, a controller 220, a transceiver 225, and a user interface 230. In alternative embodiments, the wireless indicator device 200 can have additional, fewer, and/or different elements. The wireless indicator device 200 can be configured to be added to a detector 100 which indicates an alarm mode via sound. For example, the wireless indicator device 200 can be adhered to a case or shell of the detector 100. The wireless indicator device 200 can listen for the detector 100 to audibly indicate an alarm and, when the wireless indicator device 200 senses the audible indication, the wireless indicator device 200 can send a wireless electromagnetic signal indicating that the detector 100 is in alarm.

Wireless indicator device 200 can be attached to a detector 100 via any means known in the art. For example, an adhesive can be applied to a side of the wireless indicator device 200 such that the wireless indicator device 200 can stick to a detector 100. In some embodiments, glue, rubber cement, or other adhesive can be used. In some embodiments, a detector 100 can be configured to receive the wireless indicator device 100, for example, in a slot or pocket.

Sensor 205 can be a sensor that converts sound into an electrical signal. For example, sensor 205 can be a piezoelectric device that converts vibrations into electrical signals, for example alternating current signals. The piezoelectric device can be, for example, a Midé Volture V21BL piezoelectric energy harvester. In alternative embodiments, a different piezoelectric device may be used. The piezoelectric device can be placed in mechanical communication with an object that vibrates when a detector 100 sounds an alarm. That is, the piezoelectric device can be placed such that the piezoelectric device vibrates when the detector 100 alarm is set off. For example, the sensor 205 can be placed on the housing of the detector 100. When the detector 100 sounds a notification, the vibrations caused by the speaker can cause vibrations in the housing of the detector 100. The vibrations of the housing of the detector 100 can cause the sensor 205 to vibrate and, therefore, produce electrical signals.

The power source 210 can provide power to the wireless indicator device 200. For example, the power source 210 can be a battery such as a coin cell battery, a watch battery, or a button cell battery. The power source 210 can be a lithium ion battery. In some embodiments, the power source 210 can be the sensor 205. For example, if the sensor 205 is a piezoelectric device that produces electrical energy from vibrations, the electrical energy produced by the piezoelectric device can be used to power the various components of the wireless indicator device 200.

The charge manager 215 can be configured to receive signals from the sensor 205 and to provide signals to the controller 220. The charge manager 215 can be configured to operate on power received by the sensor 205. The charge manager 215 can be, for example, a Linear Technology LTC3588 piezoelectric energy harvesting power supply. In alternative embodiments, a different charge manager may be used. The signals received from the sensor 205 are dependent on the magnitude and frequency of the vibration sensed by the sensor 205. However, the wireless indicator device 200 can be configured to wirelessly transmit a signal indicating the detector 100 is in alarm only when the detector 100 is sounding an alarm, and can be configured to not be triggered by other vibrations (e.g., a low battery indication). For example, the audible sound from a person talking while underneath the detector 100 with the wireless indicator device 200 can induce some vibrations detected by the sensor 205. The charge manager 215 can be used to, in essence, filter the signals received by the sensor 205 and indicate to the controller 220 when the sensor 205 has detected that the detector 100 is in alarm. That is, the charge manager 215 can be configured to not indicate that the detector 100 is in alarm when the sensor 205 detects the vibrations caused by speech. The charge manager 215 can be configured to determine that the signal from the sensor 205 is indicative of the detector 100 sounding an indication based on at least one of a magnitude or a frequency of the electrical signal received from the sensor 205.

The charge manager 215 can rectify the signal received from the sensor 205 and amplify the voltage. Rectification and amplification of the voltage can be performed to modify the signal to a useable form by the controller 220. For example, controller 220 may require an input signal to be a direct current signal of at least 1.5 Volts. Accordingly, the charge manager 215 can rectify an alternating current signal received by the sensor 205 to create a direct current signal for use by the controller 220. Similarly, the charge manager 215 can amplify a 1 Volt signal to a 1.5 Volt signal for use by the controller 220.

The charge manager 215 can also filter the signal received by the sensor 205 for a particular frequency band. Different sounds create different vibrations. Different vibrations sensed by the sensor 205 can result in different frequency outputs by the sensor 205. Accordingly, different sounds correspond to different frequency outputs by the sensor 205. The charge manager 215 can filter the signals received by the sensor 205 such that relevant signals can be sent to the controller 220. For example, a detector 100 can have a speaker that sounds at a particular pitch that corresponds to a particular frequency output of the sensor 205. The charge manager 215 can filter signals received by the sensor 205 such that the frequency corresponding to the particular pitch can cause the charge manager 215 to send a signal to the controller 220 indicating that the detector 100 is sounding an alarm.

The charge manager 215 can have an under-voltage lockout device that allows a charge from the sensor 205 to accumulate on a capacitor, thereby acting as a low pass filter. When a threshold level of charge is accumulated, the charge manager 215 can provide an output to the controller 220 that is indicative of the detector 100 being in alarm. The capacitor can be designed to be a non-ideal capacitor, in that the capacitor can be "leaky." That is, the capacitor can be configured to allow charge across the capacitor plates to dissipate over time. A leaky capacitor can help ensure that a sustained frequency and amplitude of the signal from the detector 100 will activate the output of the charge manager 215 and a series of low amplitude signals over time will not activate the output of the charge manager 215.

In some embodiments, the output of the charge manager 215 can be a binary signal. In other embodiments, the output to the controller 220 can be a voltage ranging from a minimum to a maximum. For example, the output to the controller 220 can range from 0 Volts direct current (Vdc) to 1.8 Vdc. The output signal of 0 Vdc can indicate that the sensor 205 detects no vibration, and 1.8 Vdc can indicate that the sensor 205 detects vibration consistent with the detector 100 sounding an alarm. An output of a value that is a threshold percentage less than the maximum output can indicate that the detector 100 is no longer sounding an alarm. For example, an output of 92% of the maximum output (e.g., 1.8 Vdc) after the output was at the maximum output can indicate that the detector 100 is not sounding. In other embodiments, an output threshold can be 91.5%, 91%, 90%, 92.5%, 93%, 94%, etc.

The output signal of the charge manager 215 can be received by the controller 220. The controller 220 can be, for example, a microprocessor. In some embodiments, controller 220 can include a memory storage device. The controller 220 can be configured to be in a low-power state until the controller 220 receives the output signal from the charge manager 215. That is, the controller 220 can be in a normal, "sleep" mode until a signal is received from the charge manager 215 indicating that the detector 100 is sounding an indication. When the controller 220 receives a signal from the charge manager 215 indicating that the detector 100 is sounding an alarm, the controller 220 can be configured to cause the transceiver 225 to send a wireless signal indicating that the detector 100 is sounding the alarm.

The controller 220 can be configured to monitor the output signal from the charge manager 215 and determine the difference between an alarm condition of a detector 100 and a notification mode of the detector 100. For example, many smoke detectors provide an audible chirp periodically (e.g., a half-second noise every fifteen minutes) to notify occupants that a battery of the smoke detector is low. The smoke detector can also make a similar audible noise at a higher frequency (e.g., a one-second noise every two seconds). Controller 220 can be configured to determine that such a chirp is not an alarm condition based on the duration and/or duty cycle of the sound.

In such an example, when the smoke detector makes a notification chirp, the sensor 205 produces enough power that the charge manager 215 sends a signal to the controller 220. The controller 220 can receive the signal indicating that the smoke detector made noise for, e.g., a half of a second (e.g., as opposed to a full second). In such an example, the controller 220 does not receive another indication that the smoke detector made noise for another fifteen minutes. Based on the duty cycle of the audible noise, the controller 220 can determine that the smoke detector is not in alarm. Similarly, because the indication that the smoke detector made a sound for a half-second, the controller 220 can determine that the smoke detector is not in alarm based on the duration of the audible noise.

In some embodiments, the controller 220 can be configured to monitor for a particular duration and/or duty cycle that is specific to the detector 100. For example, the controller 220 can be configured to recognize a particular pattern in the noise produced by the detector 100 while in alarm mode. The controller 220 can monitor for the particular pattern and determine that the detector 100 is in an alarm mode when the controller 220 recognizes the particular pattern. The controller 220 can compare characteristics of a received signal (e.g., duration and/or duty cycle) with characteristics stored in memory. The characteristics stored in memory can be the characteristics known to correspond to detector 100 being in alarm mode and/or notification mode.

FIG. 3 is a circuit schematic 300 illustrating a configuration of components of wireless indicator device 200, in accordance with an illustrative embodiment. The wireless indicator device 200 can include the sensor 205, the power source 210, the charge manager 215, the controller 220, capacitors 310, and an inductor 315. In alternative embodiments, the wireless indicator device 200 can have additional, fewer, and/or different elements, for example, elements of FIG. 3. As shown in FIG. 3, the sensor 205 can be configured to provide a signal to the charge manager 215. The charge manager 215 can have a plurality of pins, some of which are labeled in FIG. 3 as PZ1, PZ2, $V_{in}$, $V_{in2}$, $V_{out}$, CAP, SW, PGOOD, D0, D1, and GND. Such pin labels correspond to pins of the Linear Technology LTC3588 piezoelectric energy harvesting power supply. The controller 220 can have a plurality of pins, some of which include $V_{in}$, Wake, and GND. As shown in FIG. 3, the charge manager 215 can be configured to monitor the signal received from sensor 205 and output a voltage from pin PGOOD based on the signal received from sensor 205. The controller 220 can receive the output from pin PGOOD at a pin labeled Wake in FIG. 3. Upon receipt of the voltage at pin Wake, the controller 220 can "wake up" and perform functions with regard to elements not shown in FIG. 3, for example, transceiver 225.

Transceiver 225 can be communicatively coupled to the controller 220 and can be configured to transmit a wireless signal. In some embodiments, the transceiver 225 can be an antenna electrically connected to the controller 220. In other embodiments, transceiver 225 can include an antenna and a transmitter device configured to receive a signal from the controller 220 and, in response to receiving the signal from the controller 220, transmit a wireless signal via the antenna. The antenna can be a circuit trace on a flexible base of the wireless indicator device 200. The circuit trace can be a conductive material (e.g., copper, aluminum, etc.) on a printed circuit board. The wireless signal can use any protocol, frequency, etc. known to those of skill in the art, including 345 mega Hertz (MHz), amplitude shift keying (ASK), on-off keying (OOK), IEEE 802.15.4, Bluetooth, Low-Energy Bluetooth (BLE), etc. In some embodiments, transceiver 225 can be configured to transmit a signal via a wired connection to another device.

In some embodiments, the controller 220 and the transceiver 225 can be configured to transmit status signals. For example, wireless indicator device 200 can be configured to send a signal indicating that a battery of the wireless indicator device 200 is low. As discussed above, the wireless indicator device 200 can determine that the detector 100 is indicating a low battery alarm (or other status or malfunction) based on the sound made by the detector 100. Thus, when the wireless indicator device 200 determines that the detector 100 is in a low battery alarm, the transceiver 225 can transmit a signal indicating that the wireless indicator device 200 is in a low battery alarm. The signal indicating that the detector 100 is in a low battery alarm can be a different signal than the signal indicating that the detector 100 has detected an alarm condition, e.g., excessive smoke. In another example, the wireless indicator device 200 can be configured to transmit a periodic signal (e.g., once a minute, once an hour, once a day, once a week, etc.) indicating that the wireless indicator device 200 is operating normally. In some embodiments, user interface 230 can comprise one or more indicators (e.g., light-emitting diodes (LEDs) or a liquid crystal display (LCD)) to convey low battery, normal operating conditions, etc.

Wireless indicator device 200 can include a user interface 230 which can be, for example, a button. In some embodiments, the user interface 230 can be integrated into the other components of the wireless indicator device 200. For example, the wireless indicator device 200 can be configured to detect a user tapping the wireless indicator device 200 (e.g., one tap every second for three seconds). Detection of the user tapping can be used to indicate that the wireless indicator device 200 should be in a setup mode, for example. User interface 230 can be configured to cause the wireless indicator device 200 to transmit a signal, as if the wireless indicator device 200 had detected that the detector 100 was in alarm mode. User interface 230 is discussed in further detail below with regard to FIG. 5.

In some embodiments, wireless indicator device 200 can transmit encrypted signals such that only devices associated with the wireless indicator device 200 can understand signals transmitted by the wireless indicator device 200. For example, user interface 230 can be configured to receive an indication that signals sent via the transceiver 225 are to be encrypted. In some embodiments, the indication can be received via a button or switch. For example, the button can be a toggled button with a plurality of states, each state associated with a particular encryption method. In another example, the button can be a momentary button, and the wireless indicator device 200 can receive such an indication based on the number and duration of button depressions. In yet another example, encryption can be based on the states of a plurality of dip switches. In other embodiments, any method known to those of the skill can be used to determine an encryption method.

In embodiments in which the wireless indicator device 200 transmits encrypted signals, devices configured to receive such signals can be set up to receive the encrypted signals. For example, a code or key may be input to a device such as a user device 610 or a system server 600, discussed in greater detail below. The code or key can be associated with the particular encryption used by the wireless indicator device 200. Based on the code or key, the user device 610, for example, can decrypt signals received from the wireless indicator device 200. In some embodiments, the code or key need only be input to one device, such as user device 610. User device 610 can then transmit the code or key to other devices configured to receive transmissions from the wireless indicator device 200.

In some embodiments, wireless indicator device 200 can be pre-configured to transmit encrypted information, for example, by a manufacturer. In such embodiments, devices configured to receive such information can use an identification code associated with the wireless indicator device 200 to decrypt the information. For example, a wireless indicator device 200 can have an identification code of 1234. The identification code can be any code known to those of skill in the art. During a set-up of the wireless indicator device 200, discussed in greater detail below, a server (or other device) can receive the identification code of 1234 via, for example, user input via text or speech, an optical code such as a bar code or a quick response (QR) code, or any other method known to those of skill in the art. The code of 1234 can then be used to decrypt messages received from the wireless indicator device 200.

Wireless indicator device 200 can be thin and flexible. Wireless indicator device 200 can further include markings or other indications identifying the wireless indicator device 200. Such markings can include a printed serial number, manufacturer's number, manufactured date, part number, model number, a bar code, a Quick Response (QR) code, etc. In some embodiments, the identifying information can be transmitted via near-field communications (NFC).

In some embodiments, wireless indicator device 200 can include an additional sensor 205. In such embodiments, the additional sensor 205 can be used as a backup or an alternate to the sensor 205 discussed above. In alternative embodiments, the additional sensor 205 can be configured to detect an alarm condition, e.g., excessive smoke, heat, carbon monoxide, occupancy, etc. In such embodiments, the wireless indicator device 200 can be used to convert a detector 100 into a wireless, combination detector. For example, the addition of wireless indicator device 200 to a smoke detector can allow an indication to a computing system of the smoke detector detecting smoke (as discussed above) and allow an indication to the computing system of an additional condition, e.g., excessive heat.

In some embodiments, the additional condition can be similar to the condition the detector 100 is configured to detect. In some embodiments, detector 100 can be configured to alarm if smoke above a first threshold is detected by the detector 100. In one embodiment, wireless indicator device 200 can also be configured to detect (and/or alarm and/or provide an electronic indication of) smoke above the first threshold. In such an embodiment, the wireless indicator device 200 can provide redundancy. In another embodiment, wireless indicator device 200 can be configured to detect (and/or alarm and/or provide an electronic indication of) smoke above a second threshold, which can be higher or lower than the first threshold. In such an embodiment, the wireless indicator device 200 can provide sensitivity to the sensed condition.

The additional sensor 205 can be any sensor known to those of skill in the art, such as an ionization or photoelectric smoke detector, a resistance thermometer (RTD), a thermocouple, a camera, a motion detector, etc. The additional sensor 205 can be in communication with controller 220 or an additional controller 220. The wireless indicator device 200 can be configured to transmit via the transceiver 225 a signal when the additional sensor 205 detects an alarm condition. In some embodiments, the circuit and/or functionality of the additional sensor 205 and the (additional) controller 220 can be the same as (or similar to) circuits described herein. In other embodiments, the circuit and/or functionality of the additional sensor 205 and the (additional) controller 220 can be any circuit and/or functionality known to those of skill in the art.

Figure 4:
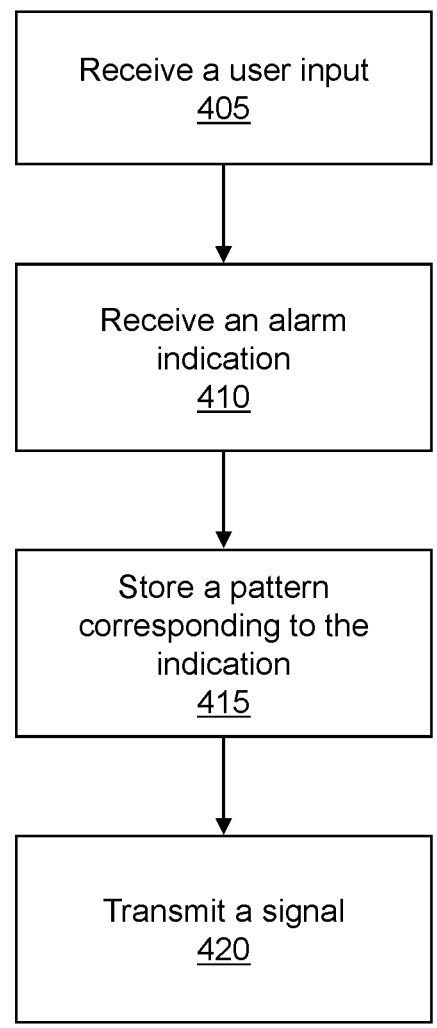
FIG. 4 is a flow diagram of a method of installing a wireless indicator device in accordance with an illustrative embodiment.

FIG. 4 is a flow diagram of a method of installing a wireless indicator device 200 in accordance with an illustrative embodiment. In alternative embodiments, fewer, additional, and/or different operations may be performed. Also, the use of a flow diagram is not meant to be limiting with respect to the order of operations performed. A wireless indicator device 200 can be installed on a detector 100. In an operation 405, the wireless indicator device 200 can receive a user input. As discussed above, the user input can be received from a button pressed by the user. The wireless indicator device 200 can enter a setup mode. In the setup mode, the wireless indicator device 200 can "learn" the detector 100 that the wireless indicator device 200 is associated with. The wireless indicator device 200 can also transmit information identifying the wireless indicator device 200.

In response to receiving the user input, the wireless indicator device 200 can "listen" for the detector 100 to indicate an alarm. A user can artificially induce an alarm condition or can press a test button on the detector 100. In an operation 410, the wireless indicator device 200 can receive an alarm indication. As discussed above, the alarm indication can be a sensed vibration caused by an audible alarm of the detector 100. The wireless indicator device 200 can identify characteristics of the alarm indication such as a vibratory magnitude, a duration of the audible alarm pulses, and/or a duty cycle of the alarm pulses. The indication can be, for example, a particular vibratory magnitude for one second repeating every two seconds.

In an operation 415, the wireless indicator device 200 can store the pattern corresponding to the received alarm indication. For example, the wireless indicator device 200 can store one or more of the characteristics of the alarm identified in a memory associated with the wireless indicator device 200. In an operation 420, the wireless indicator device 200 can transmit a signal. The signal can indicate that the wireless indicator device 200 detected that the detector 100 is (or was) indicating an alarm. In some embodiments, the transmitted signal can be the same as a signal transmitted when the wireless indicator device 200 detects that the detector 100 is in alarm mode under normal operating conditions (e.g., not in setup mode). In other embodiments, the transmitted signal while in setup mode can be different than a signal transmitted under normal operating conditions when an alarm is detected.

The signal transmitted by the wireless indicator device 200 can be unique to the wireless indicator device 200. For example, the signal can be an arbitrary number, code, etc. that can be assigned to the wireless indicator device 200. In such an example, the manufacturer can assign the arbitrary identifier to the wireless indicator device 200. In another example, the signal can include identifying information such as a serial number, model number, date of manufacture, etc. In some embodiments, the signal can include additional information such as a duration the wireless indicator device 200 has determined the detector 100 to be indicating an alarm. Other information can include the identified characteristics of the alarm. The wireless indicator device 200 can operate in a normal mode by monitoring for the identified characteristics and transmitting a signal when one or more of the identified characteristics are detected.

Figure 5:
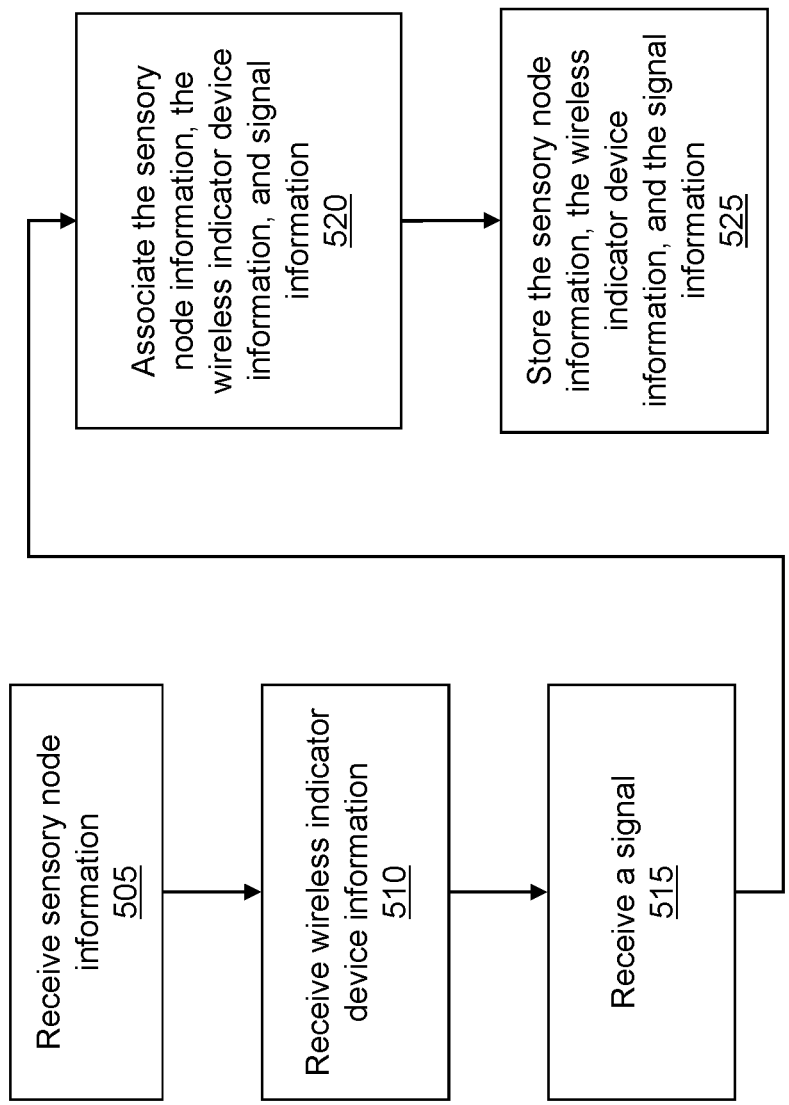
FIG. 5 is a flow diagram of a method of setting up a wireless indicator device at a computing device.

FIG. 5 is a flow diagram of a method of setting up a wireless indicator device 200 at a computing device such as user device 610 or system server 600, discussed in more detail below. In alternative embodiments, fewer, additional, and/or different operations may be performed. Also, the use of a flow diagram is not meant to be limiting with respect to the order of operations performed. The computing device can be a building management system, a server, a personal computer, a smartphone, etc. In some embodiments, the computing device can be a plurality of computing devices. The computing device can be configured to receive signals from the wireless indicator device 200. In some embodiments, the computing device can be configured to notify users, emergency personnel, etc. when an alarm condition is detected.

In an operation 505, the computing device can receive detector 100 information. In some embodiments, the detector 100 information can be received via a user interface. In some embodiments, the detector 100 information can be received from another computing device, such as a smartphone. In such embodiments, the other computing device can receive such information from a user input, by detecting information via an optical sensor (e.g., a bar code, a QR code, etc. via a camera). Such information can identify the detector 100 and provide information about the detector 100. Such information can include model numbers, serial numbers, a type of alarm (e.g., smoke detector, carbon monoxide detector) etc. of the detector 100 and/or one or more audible patterns of the sensory node for one or more conditions (e.g., sensed smoke, sensed high temperature, low battery, test). In some embodiments, the sensory node information can include location information such as a room name (e.g., living room, Rutherford's room, Hallway B), a geographic location (e.g., northwest corner), a floor level (e.g., Level 3, upstairs), a global positioning system (GPS) coordinates, etc.

In an operation 510, the computing device can receive wireless indicator device 200 information. In some embodiments, the wireless indicator device 200 information can be received via a user interface. In some embodiments, the wireless indicator device 200 information can be received from another computing device, such as a smartphone. In such embodiments, the other computing device can receive such information from a user input, by detecting information via an optical sensor (e.g., a bar code, a QR code, etc. via a camera). Such information can identify the wireless indicator device 200 and provide information about the detector 100. Such information can include model numbers, serial numbers etc. of the wireless indicator device 200. In some embodiments, the sensory node information can include location information such as a room name (e.g., living room, Rutherford's room, Hallway B), a geographic location (e.g., northwest corner), a floor level (e.g., Level 3, upstairs), global positioning system (GPS) coordinates, etc.

The computing device can "listen" for a signal indicating that the detector 100 is sounding an alarm. In an operation 515, the computing device can receive a signal from the wireless indicator device 200. The signal can indicate that the wireless indicator device 200 detected that the detector 100 is (or was) sounding an alarm. In some embodiments, the received signal can be the same as a signal received when the wireless indicator device 200 detects that the detector 100 is in alarm mode under normal operating conditions (e.g., not in a setup mode). In other embodiments, the received signal can be while the wireless indicator device 200 is in setup mode and the received signal can be different than a signal received when an alarm is detected under normal operating conditions.

The signal received from the wireless indicator device 200 by the computing device can be unique to the wireless indicator device 200. For example, the signal can be an arbitrary number, code, etc. that can be assigned to the wireless indicator device 200. In such an example, the manufacturer can assign the arbitrary identifier to the wireless indicator device 200. In another example, the signal can include identifying information such as a serial number, model number, date of manufacture, etc. In some embodiments, the signal can include additional information such as a duration the wireless indicator device 200 has determined the detector 100 to be in alarm mode. Other information can include characteristics of the alarm identified by the wireless indicator device 200, a date and/or time that the wireless indicator device 200 was setup, etc.

In an operation 520, the computing device can associate the detector 100 information, the wireless indicator device 200 information, and signal information. The signal information can include a frequency the signal was transmitted with, a protocol used, any information included in the signal, etc. In an operation 525, the computing device can store, in a memory associated with or accessible by the computing device, the detector 100 information, the wireless indicator device 200 information, and the signal information. Such information can be stored, for example, in a same file or in a database. The computing device can operate in a normal mode by "listening" for another signal from the wireless indicator device 200 indicating that the wireless indicator device 200 detected that the detector 100 is alarming.

Figure 6:
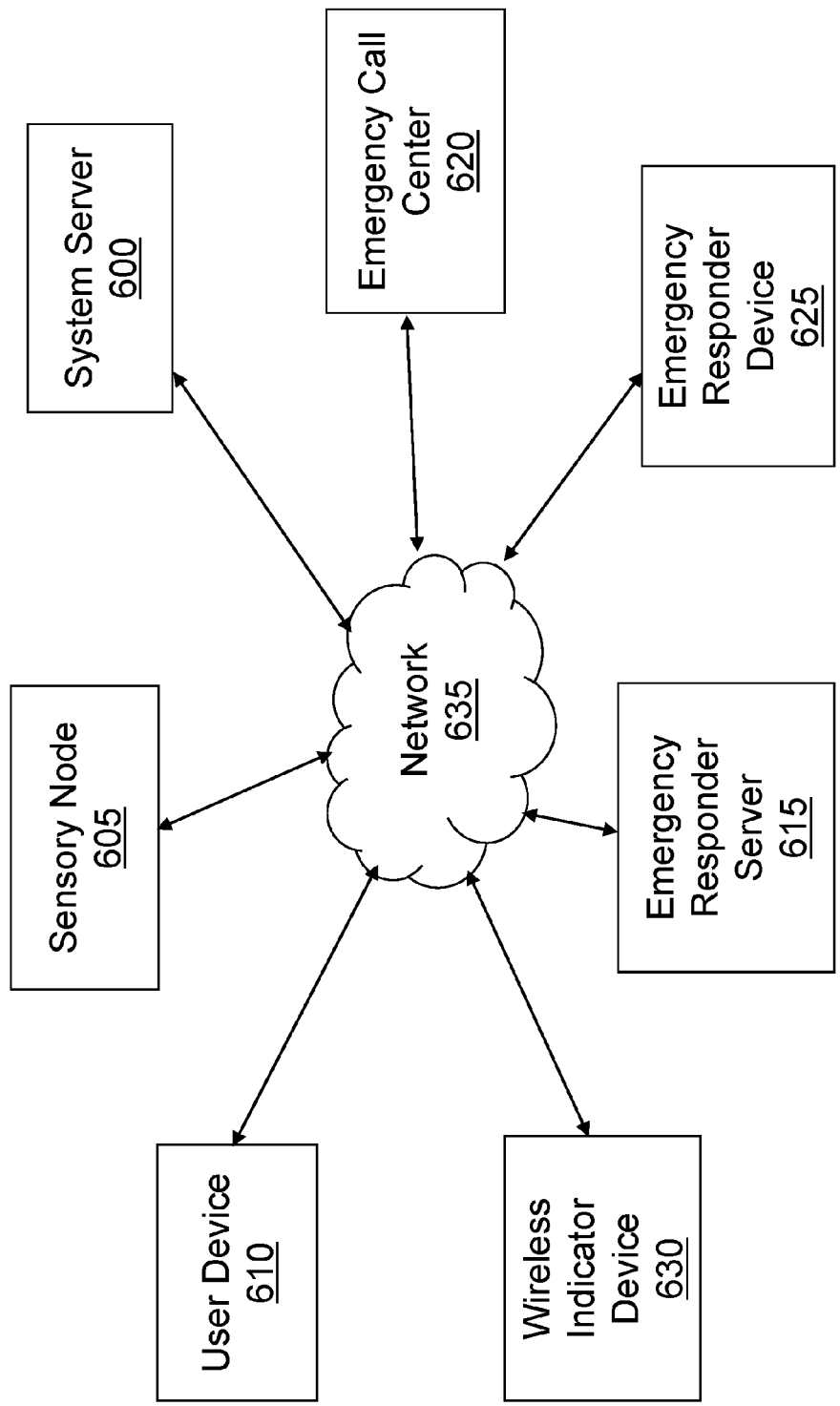
FIG. 6 is a diagram illustrating a communication system in accordance with an illustrative embodiment.

FIG. 6 is a diagram illustrating a communication system in accordance with an illustrative embodiment. In other embodiments, additional, fewer, or alternative elements may be used. A communication system can include a system server 600, a sensory node 605, a user device 610, an emergency responder server 615, an emergency call center 620, an emergency responder device 625, a wireless indicator device 630, and a network 635.

Although not illustrated, it is to be understood that the communication system can include a plurality of any of the elements. For example, the communication system may include a plurality of sensory nodes 605, wireless indicator devices 630, and/or a plurality of emergency responder devices 625. Further, the communication system can include various types of any of the elements. For example, the communication system can include a sensory node 605 that is configured to detect smoke and a sensory node 605 that is configured to detect carbon monoxide. Communications may occur through network 635, which may include a direct link or a network such as the Internet, cellular network, local area network, etc. Network 635 can include one or more individual networks. For example, network 635 can include a local area network and the Internet.

In some embodiments, one or more elements can be configured to receive information transmitted by the wireless indicator device 630 and to retransmit or forward the information to other elements. In such embodiments, the various elements of the network can form a self-healing network. That is, multiple communication paths can exist for a wireless indicator device 630 to reach a destination. For example, a signal transmitted by wireless indicator device 630 can be received by a sensory node 605 which can, in turn, transmit information contained in the signal to system server 600. In such embodiments, multiple elements (e.g., one or more sensory nodes 605 and/or one or more user devices 610) can receive a signal transmitted by a wireless indicator device 630 and retransmit the signal. In some embodiments, the signal can be retransmitted in a manner such that the information transmitted by the wireless indicator device 630 reaches a final destination, such as a user device 610 or a system server 600.

As discussed above, wireless indicator device 630 can be associated with a detector that does not, by itself, have the capability to transmit information via electromagnetic signals (e.g., wireless signals). The wireless indicator device 630 can be used to add such a capability to the detector. As discussed above, the detector can be any detector known to those of skill in the art, for example, a smoke detector, a heat detector, an occupancy detector, and/or a carbon monoxide detector. Sensory node 605 can include a detector and a communication interface that allows the sensory node 605 to communicate via electromagnetic signals. Sensory node 605 can be, for example, a sensory node described in U.S. application Ser. No. 14/633,949, filed Feb. 27, 2015, which is incorporated herein by reference in its entirety. Sensory node 605 can be configured to detect smoke, heat, occupancy, carbon monoxide, etc.

Sensory node 605 and/or wireless indicator device 630 located in a structure can provide detected information, status information, etc. to devices, e.g., a system server 600. The sensory node 605 can also receive instructions, evacuation routes, etc. from devices, e.g., the system server 600 and/or user device 610. The sensory node 605 and/or wireless indicator device 630 can communicate with devices, e.g., a user device 610, to provide alerts and receive acknowledgements and/or instructions regarding the alerts. In an alternative embodiment, communication of alerts and acknowledgements may be between the system server 600 and the user device 610. The user device 610 can also communicate with the sensory node 605, wireless indicator device 630, and/or system server 600 during installation and/or testing of the system. The user device 610 can be any device configured to convey information such as a smartphone, a smart watch, or an implantable device (such as computer chips implantable in humans).

In an illustrative embodiment, sensory node 605 and/or wireless indicator device 630 can provide detected information, status information, etc. to the user device 610. User device 610 can, based at least in part on the information provided by the sensory node 605 and/or wireless indicator device 630, determine that there is an evacuation condition. In such an embodiment, the user device 610 can provide the information regarding the evacuation condition to another device, e.g., the emergency responder server 615. Thus, the system server 600 need not receive the information regarding the evacuation condition before the emergency responder server 615 is notified.

In an illustrative embodiment, the user device 610 can be a smartphone. The user device 610 can, for example, receive information from one or more sensory nodes 605 and/or one or more wireless indicator devices 630 indicating that smoke and/or high temperature has been detected. The user device 610 can determine that an evacuation condition exists based on the information received from the sensory node 605 and/or wireless indicator device 630. In some embodiments, sensory node 605 can provide additional information regarding the evacuation condition that the user device 610 can use in determining that there is an evacuation condition. The user device 610 can notify a user by any means known to those of skill in the art, for example ringing, flashing, vibrating, text message, etc.

In some embodiments, user device 610 can prompt a user to take an action based on the information received by the one or more sensory nodes 605 and/or one or more wireless indicator devices 630. For example, user device 610 can receive an indication from a wireless indicator device 630 that excessive smoke has been detected. Based at least in part on the indication, the user device 610 can prompt a user to call emergency services, such as the fire department, 911, etc. In another example, the user device 610 can prompt a user to evacuate the building based at least in part on the indication from the wireless indicator device 630. In such an example, the user device 610 can provide turn-by-turn instructions and/or a map. Such information can be stored on user device 610, or user device 610 can receive such information from a device connected to network 635.

User device 610 can receive information from one or more sensory nodes 605 and/or one or more wireless indicator devices 630 directly from the one or more sensory nodes 605 and/or one or more wireless indicator devices 630 or through network 635. In one embodiment, user device 610 can notify a user of a sensed condition received via a wireless indicator device 630 via the Internet and/or a cellular network. For example, user device 610 can receive an indication that excessive smoke has been detected by a detector associated with wireless indicator device 630 in a house of the user. The user need not be in the house to receive the notification. For example, the user could be at work, on vacation, visiting a friend, etc. User device 610 can receive other information from other devices connected to network 635 relevant to the sensed condition. For example, user device 610 can receive an indication from another device (e.g., another user device 610, a sensory node 605, etc.) that there is an occupant in the house. For example, the occupant can be a daughter of the user. Based on the information that the daughter is in the house and excessive smoke has been detected, the user device 610 can prompt a user to take action, e.g., call emergency personnel, call a phone of the daughter, send the daughter an SMS text message, etc.

In an illustrative embodiment, the system server 600, sensory node 605, and/or wireless indicator device 630 can communicate with the user device 610 during setup, installation, and/or testing of the system (e.g., as a do-it-yourself system), and also to provide warning and watch alerts. The user device 610 can be a laptop computer, cellular telephone, smart phone, desktop computer, or any other computing device known to those of skill in the art. In one embodiment, the user device 610 can be used to access a user interface such that a user can access the system. The user interface can be used by the user to select and configure a service plan associated with the system and pay bills for the service plan.

The user interface can allow the user to set system preferences, provide occupancy information, provide vehicle information, upload pictures of the structure, provide construction information regarding the structure, provide lot information, provide information regarding the density of the surrounding neighborhood, etc. Such information can be used to notify emergency personnel of relevant information. For example, information can be sent to emergency responders while the emergency responders are en route to the user's building. The system preferences can be used, for example, to determine how much information or which information should be sent to the emergency personnel. The system preferences can also be emergency-dependent such that a first set of information is sent to, for example, the fire department when excessive smoke is detected, and a second set of information is sent to paramedics when a high level of carbon monoxide is detected. Pictures of the structure, construction information, lot information, etc. can be used by emergency personnel to assess the situation and determine a response strategy. For example, if fire is detected at the user's building, construction information can tell firemen how best to put out the fire based on the materials of construction used to build the building. For example, firemen would respond to a fire of a building with an asphalt roof differently than they would respond to a fire of a building with a metal roof. In another example, information about the number of vehicles located at the building (or normally located at the building) can be used by emergency responders to determine whether occupants are likely inside the building and/or who the occupants may be.

In an illustrative embodiment, sensory node 605 and/or wireless indicator device 630 can have an identification code associated with each sensory node 605 and/or wireless indicator device 630. The identification code can be located on the sensory node 605 and/or wireless indicator device 630, for example on an exterior, a housing, or inside the housing. Alternatively, the identification code can be located on materials provided with the sensory node 605 and/or wireless indicator device 630, for example on a packaging or box of the sensory node 605 and/or wireless indicator device 630, on a card provided inside the packaging, or on a user manual. The identification code can identify the various sensory nodes 605 and/or wireless indicator devices 630 and be used to distinguish them from each other. Thus, during installation and/or setup of each sensory node 605 and/or wireless indicator device 630, information can be provided to system server 600 to further identify each sensory node 605 and/or wireless indicator device 630. The additional information can include location information such as geographical coordinates or room location (e.g. master bedroom), sensory node model/type information, last test date, etc. For example, a first sensory node 605 can be a smoke detector with an identification code X. If the first sensory node 605 detects smoke, the first sensory node 605 can notify the system server 600 of the detected smoke. The notification can include the identification code X. The system server 600 can use the identification code X to provide detailed information to emergency personnel. For example, emergency personnel can be notified that smoke has been detected in the master bedroom and that the first sensory node 605 has alarmed three times in the last month, which were all false alarms.

In embodiments in which the wireless indicator device 630 transmits identification information along with notification information (e.g., excessive carbon monoxide), devices configured to receive such information (e.g., system server 600, user device 610, etc.) can include a list of devices associated with the system. For example, a house may include five smoke detectors, three heat detectors, and one carbon monoxide detector. Each detector can have a unique identification code, which can be transmitted along with a notification of a sensed condition if a sensed condition exists. In such an example, a receiving device such as user device 610 can receive the identification code and the notification and, based on the identification code, determine that the notification of the sensed condition is associated with the house. The user device 610 can do so by comparing the identification code against a list of associated devices. The list of associated devices can include the identification codes of the five smoke detectors, the three heat detectors, and the carbon monoxide detector.

Similarly, in such an example, the user device 610 (or any other device configured to receive such information) can receive an identification code and a notification from a device that is not associated with the system. For example, a user device 610 can receive a notification of excessive heat from a device associated with a neighbor's house. The user device 610 can determine that the notification is not associated with the user's house based on the received identification code. In some embodiments, based on such a determination, the user device 610 can ignore the notification. In other embodiments, the user device 610 can be configured to notify the user of the received notification. For example, a user can be notified via text indicating, "Excessive smoke has been detected by an unknown, nearby detector."

In some embodiments, sensory node 605 and/or wireless indicator device 630 can include a near-field communication (NFC) label. In some embodiments, the NFC label can be an active label. In other embodiments, the NFC label can be a passive label. The NFC label can be used to communicate identification information, such as an identification code, a model number, a serial number, a type of sensor, a date of manufacture, etc. A device, such as user device 610, can be used to communicate with the NFC label and receive the information stored in the NFC label. The user device 610, for instance, can transmit such information to system server 600. System server 600 can, for example, receive such information during set-up of the system. The user device 610 can further communicate with the sensory node 605 and/or wireless indicator device 630 to transmit to the sensory node 605 location information (e.g., GPS coordinates, a room name), an installation time and/or date, communication network information (e.g., a network address, wireless network identification information, network access code), etc. The NFC label can further be used to locate the sensory node 605 and/or wireless indicator device 630. For example, if a building has been destroyed, a device capable of detecting the NFC label can be used to search the rubble of the building to identify the sensory node 605 and the location of the sensory node 605 in the rubble. The device could identify the identification code, the location information of where it had been installed, the manufacture date, the installation date, etc.

In another illustrative embodiment, identification codes can be used with the sensory node 605 and/or wireless indicator device 630 to indicate which user the sensory node 605 and/or wireless indicator device 630 are associated with. For example, sensory node 605 and/or wireless indicator device 630 can communicate to user device 610 and system server 600 via, at least in part, a wireless communication. In such an example, sensory node 605 and/or wireless indicator device 630 in Building A can be in communication range of sensory node 605, wireless indicator device 630, user device 610, or system server 600 of Building B. When Building A's sensory node 605 and/or wireless indicator device 630 notify Building A's system of, for example, an evacuation event, identification codes can be used to identify sensory node 605 and/or wireless indicator device 630 as part of Building A's system. Thus, Building B's system can ignore data transmitted from sensory node 605 and/or wireless indicator device 630 associated with Building A. In alternative embodiments, data received by Building B's system regarding Building A's system can be forwarded by Building B's system to Building A's system. In other embodiments, data received by Building B's system regarding Building A's system can be forwarded by Building B's system to Building A's system only if the data received is identified as being important, urgent, etc.

As discussed above, network 635 can include one or more direct links or a network such as the Internet, cellular network, local area network (LAN), etc. Sensory node 605 and/or wireless indicator device 630 can communicate with other computing devices, e.g., user device 610, via a low energy or ultra-low energy wireless communication, such as Bluetooth Low Energy (BLE). In some embodiments, sensory node 605 and/or wireless indicator device 630 can communicate directly with user device 610, thereby eliminating the need for a third-party call center 620. That is, as discussed above, based on information received from the sensory node 605 and/or the wireless indicator device 630, user device 610 can be used to notify emergency personnel. In some embodiments, both the user device 610 and the call center 620 can be notified of the information received from the sensory node 605 and/or the wireless indicator device 630. In some embodiments, the call center 620 can be notified of the information transmitted by the sensory node 605 and/or the wireless indicator device 630. Based on such information, the call center 620 can assess the information and determine whether and/or which emergency personnel should be notified.

In some embodiments, sensory node 605 and/or wireless indicator device 630 can communicate with a storage device (not shown in FIG. 6) that is constantly in communication range of sensory node 605 and/or wireless indicator device 630. Thus, sensory node 605 can store data in the storage device when the user device 610 is not within communication range. In some embodiments, sensory node 605 and/or wireless indicator device 630 communicate exclusively with the storage device. The storage device can communicate the data to user device 610 when the user device 610 is within communication range of the storage device. In such an embodiment, the storage device and/or system server 600 may not be directly connected to a network for remote communication. The data that is provided to user device 610 can include any data acquired by sensory node 605 and/or wireless indicator device 630, energy usage data within the building, and/or data from sensors placed in the building such as rain sensors, wind sensors, flood sensors, hail sensors, etc.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a piezoelectric sensor configured to generate a first electrical signal upon detection of a vibration from a detector;
   a charge manager configured to receive the first electrical signal and generate a second electrical signal if it is determined that the first electrical signal is above a threshold for a predetermined period of time;
   a processor configured to receive the second electrical signal and provide an instruction to transmit an alarm signal based at least in part on receipt of the second electrical signal; and
   a transceiver configured to receive the instruction and transmit the alarm signal.

2. The apparatus of claim 1, wherein the piezoelectric sensor is configured to provide the first electrical signal when vibrated by an audible sound created by the detector in response to a detection by the detector that an environmental condition exists.

3. The apparatus of claim 1, further comprising a flexible base, wherein the charge manager, the transceiver, and the processor are configured to be mounted to the flexible base, and wherein a bottom side of the flexible base comprises an adhesive such that the flexible base can be mounted to the detector.

4. The apparatus of claim 3, wherein the flexible base comprises the piezoelectric sensor.

5. The apparatus of claim 1, wherein the transceiver comprises an antenna, and wherein the antenna comprises a circuit trace.

6. The apparatus of claim 1, further comprising a user interface, wherein the processor is configured to be in a setup mode in response to receiving a third electrical signal from the user interface.

7. The apparatus of claim 1, further comprising a user interface, wherein the processor is configured to cause the transceiver to transmit the alarm signal in response to receiving an input from the user interface.

8. The apparatus of claim 1, further comprising a power supply configured to provide electrical power to the processor, wherein the power supply is configured to not supply power to either the piezoelectric sensor or the charge manager.

9. The apparatus of claim 8, wherein the charge manager is powered solely by electricity produced by the piezoelectric sensor.

10. The apparatus of claim 1, wherein the piezoelectric sensor is configured to provide the first electrical signal when vibrated at a first duty cycle, and wherein the first duty cycle and a duty cycle of the first electrical signal are the same.

11. The apparatus of claim 1, wherein the processor is further configured to cause the transceiver to transmit identification information based at least in part on receipt of the second electrical signal.

12. The apparatus of claim 1, wherein the processor is further configured to compare a duty cycle of the second electrical signal with a first known duty cycle, wherein the first known duty cycle corresponds to a duty cycle of a vibration indicative of an alarm condition, and wherein transmission of the alarm signal by the transceiver is further based on the comparison of the duty cycle of the second electrical signal with the first known duty cycle.

13. The apparatus of claim 12, wherein the processor is further configured to compare the duty cycle of the second electrical signal with a second known duty cycle and cause the transceiver to transmit a status signal based at least in part on the receipt of the second electrical signal and the comparison of the duty cycle of the second electrical signal with the second known duty cycle, and wherein the second known duty cycle corresponds to a duty cycle of a vibration indicating a status condition.

14. The apparatus of claim 1, wherein the charge manager is configured to:
   filter the first electrical signal;

rectify the first electrical signal; and
accumulate a charge on a capacitor,
wherein generating the second electrical signal is based at least in part on a frequency and an amplitude of the first electrical signal.

15. A method comprising:
    detecting, by a piezoelectric sensor, a vibration from a detector to which the piezoelectric sensor is mounted;
    generating, by the piezoelectric sensor, a first electrical signal in response to said detecting;
    receiving, by a charge manager in communication with the piezoelectric sensor, the first electrical signal and generating, by the charge manager, a second electrical signal if it is determined that the first electrical signal is above a threshold for a predetermined period of time;
    providing, by a processor in communication with the charge manager, an instruction to transmit an alarm signal based at least in part on the second electrical signal; and
    transmitting, by a transceiver in communication with the processor, the alarm signal.

16. The method of claim 15, wherein the piezoelectric sensor comprises a flexible base that supports the charge manager, the processor, and the transceiver.

17. The method of claim 16, wherein the flexible base includes an adhesive for attaching the flexible base to the detector.

18. A non-transitory computer-readable medium having computer-readable instructions stored thereon that, upon execution by a processor, cause a device to perform operations, wherein the instructions comprise:
    instructions to cause a piezoelectric sensor to detect a vibration from a detector to which the piezoelectric sensor is mounted;
    instructions to generate a first electrical signal in response to detection of the vibration;
    instructions to cause a charge manager to generate a second electrical signal if it is determined that the first electrical signal is above a threshold for a predetermined period of time;
    instructions to cause a processor in communication with the charge manager to generate an instruction to transmit an alarm signal based at least in part on the second electrical signal; and
    instructions to cause a transceiver to transmit the alarm signal.

19. The non-transitory computer-readable medium of claim 18, further comprising instructions to cause the transceiver to transmit identification information based at least in part on the second electrical signal.

20. The non-transitory computer-readable medium of claim 18, further comprising instructions to cause the piezoelectric sensor to generate electricity and to provide at least a portion of the generated electricity to the charge manager.

* * * * *